United States Patent [19]
Mossler

[11] 4,385,852
[45] May 31, 1983

[54] BUMPER END CAP ASSEMBLY FOR PNEUMATIC TUBE SYSTEM CARRIERS

[76] Inventor: Allen A. Mossler, 511 Elmore Ave., Park Ridge, Ill. 60068

[21] Appl. No.: 305,541

[22] Filed: Sep. 25, 1981

[51] Int. Cl.³ .............................................. B65G 51/06
[52] U.S. Cl. .................................................... 406/190
[58] Field of Search .................................. 406/184–190

[56] References Cited

U.S. PATENT DOCUMENTS

| 1,476,070 | 12/1923 | Gippert | 406/190 |
| 2,053,671 | 9/1936 | Maclaren | 406/190 |
| 3,187,886 | 6/1965 | Honey | 406/190 |
| 3,231,218 | 1/1966 | Tearne | 406/190 X |
| 3,787,008 | 1/1974 | Barnett et al. | 406/190 |

Primary Examiner—John J. Love
Assistant Examiner—L. E. Williams
Attorney, Agent, or Firm—Robert D. Silver

[57] ABSTRACT

An improved bumper two component end cap assembly for pneumatic tube system carriers is disclosed. One component is a wheel-like durable tough relatively hard moldable plastic member which serves the multiple functions of: (a) providing an outer wear surface for engagement with pneumatic tube side walls and control levers; (b) providing a configuration for confining and stabilizing the second relatively softer shock absorbing component; and (c) providing at the hub area relatively strong rigid precise surfaces for detachable rigid fastening connection to the end surfaces of the carrier per se. The second component interacts with the first component as a resilient shock absorber interposed between the first component and the end of the carrier. The second component also has portions extending axially for resilient engagement directly with the stop surfaces at end stations of the pneumatic tube systems. Thus the second component dampens shock and stress on the carriers, which may be of rigid plastic, both those received by the first component during transit through the tube system and those received directly at the end stations.

5 Claims, 8 Drawing Figures

U.S. Patent  May 31, 1983  4,385,852
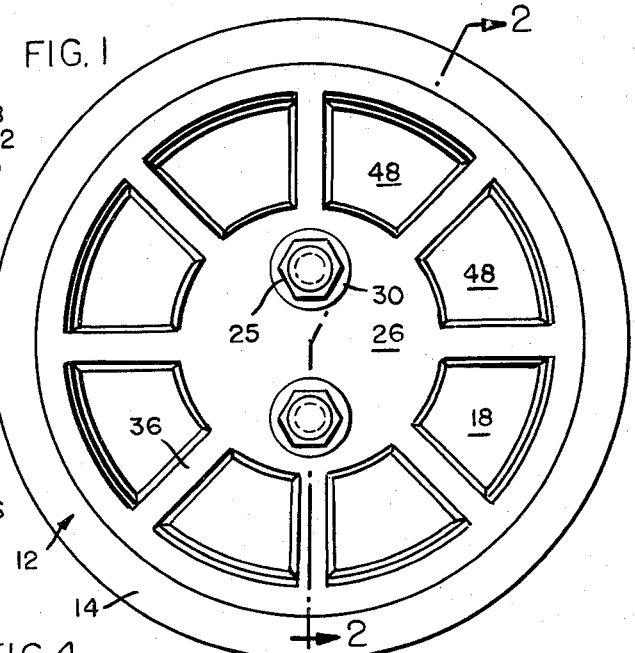
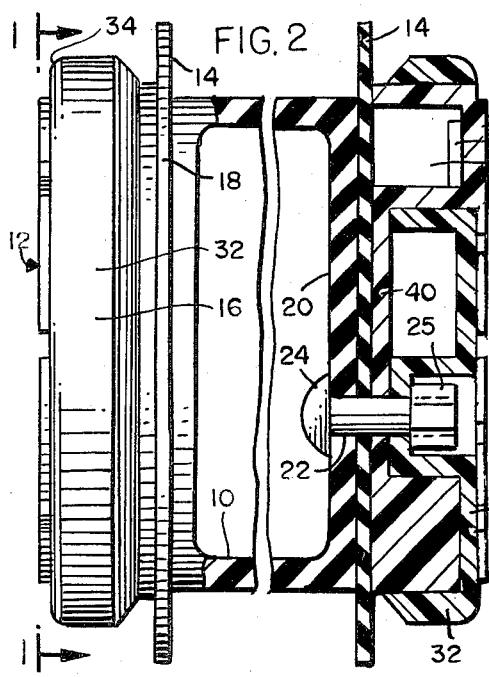
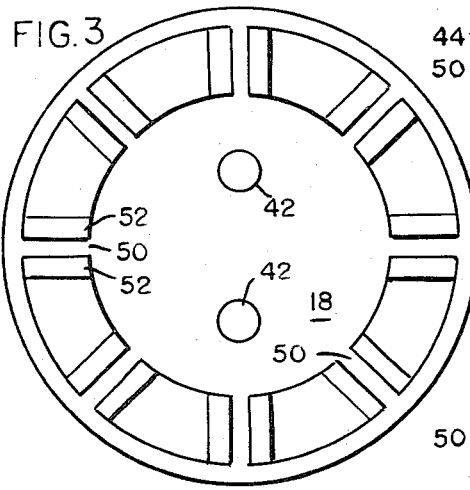
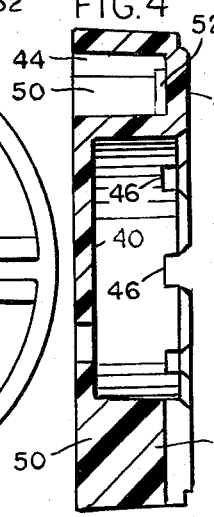
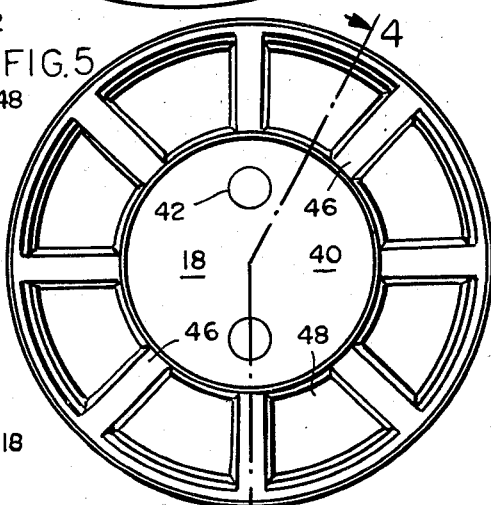
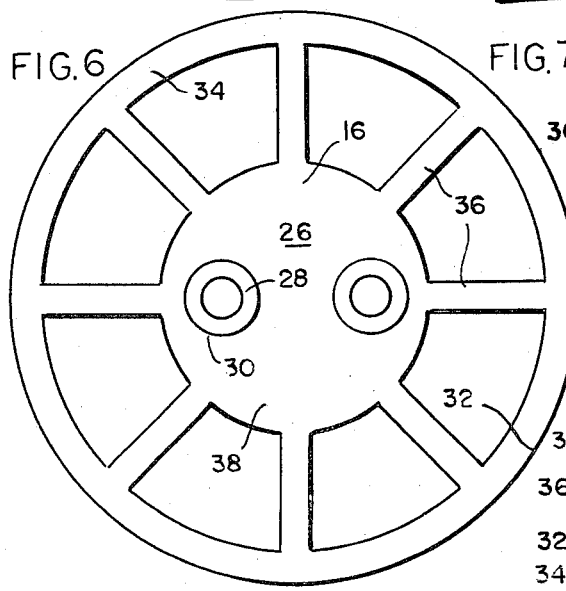
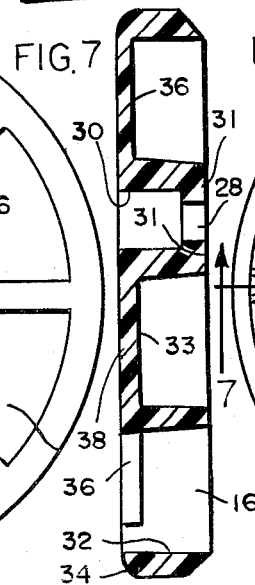
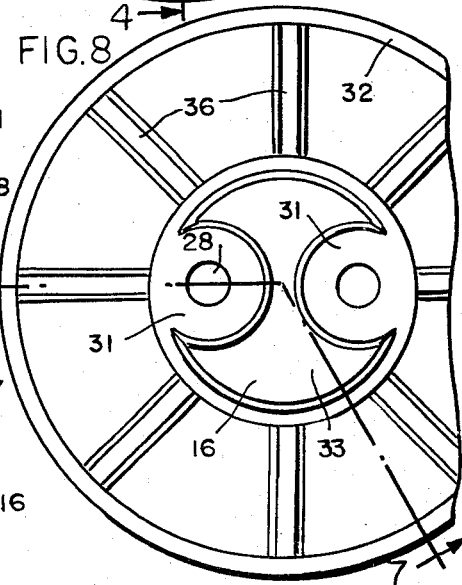

BUMPER END CAP ASSEMBLY FOR PNEUMATIC TUBE SYSTEM CARRIERS

BACKGROUND AND SUMMARY

This invention relates to bumper end cap assemblies for carriers used in pneumatic tube systems.

Pneumatic tube systems using carriers for dispatching mail, transmission of cash and other relatively small items have been used for many decades. In recent times, such systems' inherent characteristics have caused their adoption by financial organizations such as banks and savings institutions having consumer drive-in facilities. Typically, a consumer at an external end station to the system will put deposit slips and cash or checks, etc into a carrier to be transmitted to an internal station which processes the contents and returns a receipt.

The nature of this usage necessarily exposes the individual carriers to a wide variety of ambient conditions and degrees of abuse. Further, the tube systems per se are rarely "straight line" and thus the carriers have to traverse bends of various degrees of severity. The systems also are often designed with control levers which are engaged by the carriers in passage.

For consumer and institutional acceptability the carriers must be ruggedly constructed, esthetically pleasing and able to function with a high speed of passage from end station to end station. The higher the speed of passage, the greater the shock forces the carrier must encounter in stopping at the end stations. Carrier bumper end caps are used to absorb the shocks.

For many decades the most common type of end cap and bumper for the carriers has been a compressed felt end cap which is fastened to the outboard ends of the carrier and traps the disc like air skirt between the bumper and the end of the carrier body. Examples of various configurations are shown in prior art U.S. Pat. Nos. 1,476,070; 1,779,164; and 2,053,671. However compressed felt bumpers inherently have disadvantages. Among these are the presenting of relatively high frictional qualities when the bumper engages a tube wall during a bend, being by nature subject to some absorption of water from the atmosphere or from contact, and not well adopted for good wear characteristics or good appearance when in use because of handling and engaging control levers in the tube systems. The variability of ambient conditions and degradation of the end caps caused by consumer handling of carriers at the exterior stations exacerbate the inherent negative characteristics of the felt bumpers.

Attempts at providing bumper end caps for carriers which are made of materials other than felt have been tried. These have suffered one or more of the following disabilities: excessive number of parts; greatly increasing the overall length of the carrier as a percent of useful carrier space; hard to attach and detach; hard to keep clean; hard to assemble to the carrier; and esthetically unattractive after handling and use. Some examples are shown in U.S. Pat. Nos. 760,701 and 3,187,886.

The bumper end cap assembly here disclosed overcomes the prior art deficiencies. A hard moldable plastic wheel-like wear surface member interfits with a relatively softer moldable plastic shock absorbing member to simultaneously provide good wear and shock absorbing characteristics during tube transit and at end stations. The shock absorbing member underlays the wheel-like member and takes up shocks during transit or during accidental misuse by consumer handling, and is formed to extend axially beyond the wheel-like member in the aperatures of the spokes thereof and thereby take up the shock directly at the end stations. The wheel-like member provides precision rapid attachment-detachment surfaces. The entire assembly is well adapted for its intended purposes, is long wearing, is esthetically pleasing during use and handling, is easy to assemble and disassemble by non-skilled labor, is easy to store and pack, is well adapted for color coding, can be manufactured with repeatable precision, is rugged, is well adapted for mass manufacturing techniques, is easy to maintain and be kept clean and is of high quality.

BRIEF DESCRIPTION OF THE DRAWINGS

FIG. 1 is a end view of the bumpr end cap in assembled relation to a carrier and skirt along lines 1—1 of FIG. 2;

FIG. 2 is a side elevational view, partially in section of a carrier with bumper end caps assembled thereto;

FIG. 3 is a bottom view of the shock absorbing member in disassembled relationship;

FIG. 4 is a sectional view of the shock absorbing member along lines 4—4 of FIG. 5;

FIG. 5 is a top view of the shock absorbing member of FIGS. 3 and 4;

FIG. 6 is a top view of the wear member in diassembled relationship;

FIG. 7 is a sectional view of the wear member along lines 7—7 of FIG. 8; and

FIG. 8 is a partial bottom view of the wear member of FIGS. 6 and 7.

DETAILED DESCRIPTION OF THE INVENTION

A tubular carrier 10 for pneumatic tube systems is shown in FIG. 2 and may be made of metal or of hard moldable plastic with a suitable hinged door (not shown).

Assembled to each of the ends of the carrier 10 is the bumper end cap assembly 12 which is the subject of this invention. The assembly 12 coacts with the end 20 of the carrier and trappingly holds the air sealing skirt 14 to the carrier 10. The skirt 14 cooperates with the tube walls and the pressure differentials therewith as is well understood. The assembly 12 comprises a wheel-like retaining and wear member means 16 and a shock absorbing bumper means 18.

The assembly 12 is precisely located upon the transverse end surface 20 of the carrier 10. The assembly 12 is well adapted for replacement of existing felt bumpers in the field or for new carrier construction. The end surface 20 is formed with spaced aperatures 22 which mount suitable fasteners 24 such as bolts which extend through the end wall 20, the skirt 14, the bumper 18 and the wear retainer member 16 for threaded engagement with suitable nuts 25.

The wear retaining member is shown in isolation in FIGS. 6 to 8 and is formed with a central hub section 26 having spaced aperatures 28 and counterbores 30 alignable with the aperatures 22 of the end surface 20 of the carrier. The counterbore 30 is of a size to accomodate the nuts 25. The bottom side of the hub has enlarged planar surfaces 31 to distributively transmit the fastening loading forces of the nuts 25 and bolts 24, and the remainder of the hub 26 is a relatively thin web 33, the hub having been formed with a cut out to reduce the mass of the member 16.

The hub 26 is connected to an outer rim wear surface 32 by radial spokes 36 and has a rounded leading edge 34 as shown and is chamfered at the trailing edge. The ribs 36 are co-planar with a central web 33 to form a planar top surface 38.

The retaining wear member 16 is preferably formed of durable relatively hard and tough material which is moldable. One such material that has been found suitable is Dupont Super Tough Nylon which has a Rockwell hardness of approximately 112 after molding. It has been found that such material provides good rigidity and dimensional stability, good wear characteristics when the edges 32 and 34 engage the tube side walls in passage, and good shock characteristics to withstand rough use and abuse (such as dropping, etc.). It will be noted that rim 32 substantially surrounds and confines the outer periphery of the resilient bumper means 18 which will now be described.

The resilient bumper means 18 is also preferably formed of molded plastic material but with more resilient characteritics than wear member 16. Materials in the mid-range between hard and soft are found most suitable, with polyurethane black or flexible polyvinyl chloride being very suitable with a resilience in the vicinity of Shore 70 H as measured in standard resiliency tests.

Bumper member 18 is formed with a central web 40 which engages the skirt 14 on the inner side and receives the central hub surfaces 31 of member 16 on its outer side. Aperatures 42 are formed therein for alignment with aperatures 22 of the carrier end and 28 of the retainer member. Central web 40 will receive and dampen shocks received by the wear member 16 and thus protect the carrier and help reduce noise in the tube system during passage of the carrier.

Integrally formed with web 40 is a generally channel-shaped annular outwardly extending rim portion 44 which is periodically radially relieved at 46 to receive and underlay and support the spokes 36 of member 16 which nestle therewithin. The notches 46 and the overall configuration and dimensions of members 16 and 18 are such that flat bumper surface segments 48 of rim portion 44 extend axially a slight distance beyond the spaces 36, hub 26 and rim 32 of retaining member 16. It will be noted that the bumper surface segments are offset radially inwardly from the outermost periphery of rim surface 32 and project only on the order of 0.05 inches axially therebeyond so as to be clear of engagement of any tube wall bends encountered in transit. While the exact projection distance is not critical, the relationship of the projections 48 to the wear surface 32 is such that they preferably never engage a tube wall when encountering the sharpest bend which is capable of being designed for an operative tube system. Because of the construction of the planar surfaces 48, a relatively large area is provided for engagement with the stop surfaces (not shown) at the end stations of the tube systems. The resiliency of the material of member 18 also reduces the noise level of impact with the stop surfaces.

Immediately below notches 46 are molded strengthening thin webs 50 which have further supporting lugs 52 being molded on either side thereof.

From the foregoing it is seen that a compact easy to maintain bumper end cap assembly has been provided which is long wearing and simultaneously protective of the carrier 10 per se. Color coding of the end cap assemblies is easily accomplished by molding the wear member 16 in different colors. The assembly 12 may be attached by non-skilled personnel as a replacement item for existing felt end caps or assembled to new carriers. Good wear surfaces are provided for that portion that encounters wear and without sacrifice of impact shock absorption and unacceptable noise levels. The nature of the materials use prevents discoloration or absorption thereof from the body oils encountered in human handling or other liquids encountered in the environment in which it is used.

While the foregoing specification gave a detailed description of a specific embodiment of the invention, the specific embodiment was set forth for the purpose of illustration and it will be understood that many of the details herein given may be varied considerably by those skilled in the art without departing from the spirit and scope of the invention.

I claim:

1. A bumper end cap assembly for fixed attachment to an end of a cylindrical carrier for use in a pneumatic tube system comprising bumper retainer means and interlocking resilient bumper means, said retainer means being
   (a) formed of moldable relatively hard tough material and characterized as having a generally annular shaped wear surface portion having an outer periphery of a diameter greater than said cylindrical carrier,
   (b) formed with a central hub section, said central hub section being formed with a plurality of spaced axially aligned fastener receiving recesses, and
   (c) formed with a plurality of discrete radial rib means connecting said hub section to said wear surface portion and defining therewith a plurality of aperatures,
   said resilient bumper means being formed of moldable material more resilient and compressible than said retainer means and characterized as having
   (d) a central transverse portion formed with a pair of through bores alignable with said fastener receiving recesses, said transverse portion having a diameter greater than said central hub section and being fastenable into trapped fixed relationship between said hub section and the end of said carrier,
   (e) a channel shaped in cross section peripheral portion having an outer diameter surface to receive and support said wear surface portion,
   (f) transverse rib supporting portions for support of said plurality of radial ribs, and
   (g) a plurality of integral axially extending discrete bumper portions configured and arranged to extend from said rib means and projecting therebeyond and beyond said central hub section to provide resilient shock and sound absorbing bumper surfaces,
   said resilient bumper means also receiving and dampening any shock to said carrier received by said wear surface portion.

2. The bumper end cap assembly set forth in claim 1 wheein said retainer means is further characterized as being formed of moldable nylon with a Rockwell hardness of 112.

3. The bumper end cap assembly set forth in claim 2 wherein said resilient bumper means has a Shore H rating of 70.

4. The bumper end cap assembly set forth in claim 1 wherein said pneumatic tube system has curved side surfaces, said axial extent of said bumper portions from said radial rib means is a distance less than 5% of said diameter of the outer periphery of said wear surface portion whereby said outer periphery wear surface will engage said curved side surfaces in said pneumatic tube system and said bumper portions will not engage said curved side surfaces.

5. The bumper end cap assembly set forth in claim 1 wherein said discrete bumper portions have co-planar stop surfaces transverse to the axis of said assembly regularly radially arranged around said axis outboard of said central hub section and inboard of said wear surface portion of said retainer means.

* * * * *